United States Patent [11] 3,607,653

[72] Inventors Jack Ziffer
 Milwaukee;
 Simon Rothenberg, Shorewood, both of Wis.
[21] Appl. No. 745,092
[22] Filed July 16, 1968
[45] Patented Sept. 21, 1971
[73] Assignee Pabst Brewing Company
 Milwaukee, Wis.

[54] BACTERIAL PROTEASE COMPOSITIONS AND PROCESS FOR PREPARING THEM
 10 Claims, No Drawings
[52] U.S. Cl. ................................................... 195/63 R,
 195/68, 195/63 P, 252/89
[51] Int. Cl. ....................................................... C07g 7/02
[50] Field of Search ........................................... 195/68, 63,
 63 P; 252/DIG. 12

[56] References Cited
UNITED STATES PATENTS
3,472,783 10/1969 Smillie............................ 195/68 X
FOREIGN PATENTS
1,156,238 6/1969 Great Britain................. 195/68
OTHER REFERENCES
Derwent Belgium Patent Reports No. 44/67 of Belgium Patent 697,480 (patented 10/24/67).

Primary Examiner—Lionel M. Shapiro
Attorney—Johnston, Root, O'Keeffe, Keil, Thompson & Shurtleff ABSTRACT: Polyethylene glycol polymers are incorporated with bacterial protease in order to improve granular characteristics and also to stabilize the protease and decrease the typical protease odor.

BACTERIAL PROTEASE COMPOSITIONS AND PROCESS FOR PREPARING THEM

Proteolytic enzymes are well known and bacterial proteases are being used in washing compositions, especially for the purpose of laundering household fabrics and clothing. Enzymes of this type are especially useful for removing stains caused by blood, chocolate milk, gravy and other proteinaceous food residues. Enzyme compositions containing proteases can be used to make a presoaking bath for articles to be washed or they can be combined with detergents. Since many washing baths are alkaline, it is desirable that the proteolytic enzyme be sufficiently resistant to alkali so that its activity is not destroyed to the extent that the utility of the enzyme is nullified. Certain bacterial proteases have been developed which retain their activity in a pH range of about 5 to about 10.5 and are otherwise suitable for cleaning uses, either in a soaking or a prewashed product, or in a detergent product.

One of the problems encountered in the preparation of suitable bacterial proteases has been the extreme difficulty of granulating bacterial protease powders so as to facilitate their use either as such or in combination with detergents or other materials.

One of the objects of the present invention, therefore, has been to provide new and useful granulated bacterial proteases.

Another object has been to provide a new and improved process for granulating bacterial proteases.

Still a further object has been to provide a process for making granulated bacterial proteases in which there is an improvement in the stability of the bacterial protease.

A still further object is to prepare a bacterial protease product having a marked decrease in the typical protease odor. Other objects will appear hereinafter.

In accordance with the present invention it has been found that the granulating properties, as well as other properties of bacterial proteases can be enhanced by incorporating with the bacterial protease a polyethylene glycol polymer which is water soluble and normally solid (e.g., at 25° C.).

The polyethylene glycol polymer is preferably dissolved in an aqueous protease concentrate just prior to drying. This procedure affords a simple and comparatively economical method for obtaining the desired granular characteristics. According to another procedure, an aqueous solution of the polyethylene glycol polymer can be sprayed on the previously dried bacterial protease and the resultant composition can be granulated, for example, by passing it through sieves or screens with openings adapted to produce granules or agglomerates of the desired size.

In addition to the improvement in the granular characteristics of the bacterial protease, the polyethylene glycol polymer when added to a bacterial protease concentrate prior to drying produces a significant improvement in the stability of the bacterial protease during the drying operation. Furthermore, the incorporation of the polyethylene glycol polymer with the bacterial protease results in a marked decrease in the typical protease odor of the dried product.

The amount of polyethylene glycol polymer should be sufficient to improve the granulating properties of the protease. It should also be sufficient to enhance the stability of the protease and to reduce the typical protease odor. The amounts can vary depending upon the particular polyethylene glycol polymer employed but in most instances satisfactory results have been obtained by using a weight ratio of polyethylene glycol polymer to bacterial protease on a dry basis within the range of 1:8 to 1:3. Thus, in a composition containing bacterial protease and a polyethylene glycol polymer a typical composition might contain 80 percent bacterial protease and 20 percent polyethylene glycol polymer or a weight ratio of polymer to protease of 1:4.

The polyethylene glycol polymers are well-known chemical compositions and may be described by either one of the following structural formulas:

(1) 

(2) 

in which n and m are numbers such that the polymer has a high molecular weight and is normally solid at room temperatures. In general, n in formula (1) would have a value of at least 20. However, it is possible to combine these polymers with lower molecular weight polyethylene glycols so that the resultant product is still solid at ordinary temperatures but has a lower average molecular weight around 500–600. In general, the molecular weights will be within the range of 500 to 7,500. Typical compounds which can be employed for the purpose of the invention are Carbowax compounds 1,000, 1,500, 1,540, 4,000 and 6,000. Carbowax compound 1,000 has an average molecular weight of 950 to 1,050 and a freezing range of 37° –40° C. Carbowax compound 1,500 is a blend of polyethylene glycol 300 (where 300 represents the molecular weight) and Carbowax 1540. The resultant blend has an average molecular weight of 500–600 and the freezing range is 38°–41° C. Carbowax 1,540 has an average molecular weight of 1,300–1,600 and a freezing range of 43°–46° C. Carbowax compound 4000 has an average molecular weight of 3,000–3,700 and a freezing range of 53°–56° C. Carbowax compound 6000 has an average molecular weight of 6,000–7,500 and a freezing range of 60°–63° C. Polyethylene glycol polymers of even higher molecular weight can be obtained and can be used provided they are water soluble and are normally solid at room temperatures. Compounds of this type are usually prepared by the addition of ethylene oxide to ethylene glycol. They contain many ether linkages and terminal hydroxyl groups.

The invention will be further illustrated but is not limited by the following examples in which the quantities are by weight, unless otherwise indicated.

EXAMPLE I 280 grams of Carbowax 4000 were dissolved in 4,000 grams of a bacterial protease concentrate containing 28.4 percent solids and having an activity of 29,388 PV units per gram. The mixture was dried on a vacuum rotary double drum drier (29 inches of vacuum, 5–7 pounds vacuum steam on rolls and 4 revolutions per minute). The dried product was redried for 8 hours in a tray drier at 35° C., then brushed through a 20-mesh screen (U.S. Standard Sieve Series) and blended for 5 minutes. A good granulated product was obtained containing 95.7 percent dry solids and assaying 79,285 PV/gm. This product contained 80 percent bacterial protease and 20 percent polyethylene glycol polymer.

EXAMPLE II

The procedure was the same as in example I except that 1.136 grams of Patent Blue VF Extra Conc. dissolved in a small amount of water with gentle heating was added to the mixture of Carbowax 4000 and bacterial protease concentrate. This produced a blue product in which the dye constituted approximately 0.1 percent by weight of the solids.

EXAMPLE III

The procedure was the same as in example II except that the dye used was F. D. & C Blue No. 1.

EXAMPLE IV

The procedure was the same as in example II except that the dye was Neptune Blue BRA Conc.

EXAMPLE V

The procedure was the same as in Example II except that the dye used was Sulpho Rhodamine B Extra.

EXAMPLE VI

The procedure was the same as in example I except that the quantity of Carbowax 4000 was 17.3 percent and the quantity of bacterial protease 82.7 percent in the final dried product. The dried material was screened through a 60-mesh screen.

EXAMPLE VII

The procedure was the same as in example II except that the dye was Auramine OS Extra.

EXAMPLE VIII

The procedure was the same as in example II except that the final product contained 0.1 percent of Rhodamine B Extra S and 0.1 percent of Auramine OS Extra.

EXAMPLE IX

The procedure was the same as in example II except that the dye used was Acid Orange XX.

EXAMPLE X

The procedure was the same as in example II except that the dye used was Fast Light Red BA.

EXAMPLE XI

The procedure was the same as in example II except that the final product contained 0.1 percent Rhodamine B Extra S and 0.01 percent Patent Blue VF Extra Conc.

EXAMPLE XII

A drum dried bacterial protease having an activity of 60,633 PV/gm. was screened 20 to 80 mesh and sprayed with a 4 percent aqueous solution of Carbowax 1500. The product was given a sieve analysis before and after a 30-minute attrition test with the following results:

% On Sieve

| Sieve No. | Before | After |
| --- | --- | --- |
| 20 | 12 | 10 |
| 40 | 86 | 88 Assay 57,559 PV/gm. |
| 60 | 2 | 2 |
| 80 | 0 | 0 |
| 100 | 0 | 0 |
| Thru 100 | 0 | 0 |

EXAMPLE XIII

The procedure was the same as in example XII except that the drum dried protease was sprayed first with 2.7 percent aqueous solution of Carbowax 1500 and then with 1.3 percent aqueous solution of Carbowax 4000.

EXAMPLE XIV

The procedure was the same as in example XIII except that 2.7 percent of Carbowax 4000 was used instead of 1.3 percent.

EXAMPLE XV

The procedure was the same as in example I except that the amount of Carbowax 4000 in the final product corresponded to 17.3 percent and the amount of bacterial protease was 82.7 percent. The dried material was screened through a 14-mesh screen and then sprayed with 2.7 percent aqueous solution of Carbowax 1500 and 2.7 percent aqueous solution of Carbowax 4000. 0.25 percent Lemon Tang perfume was added to the blend. This product assayed 63,525 PV/gm.

EXAMPLE XVI

The process was the same as in example XV except that 0.1 percent dye (Neptune Blue BRA) was added. This product assayed 63,475 PV/gm.

The compositions of the invention are used in a conventional manner, either as a component of a presoak bath or as a component of a detergent composition, for example, a regular laundry detergent. They can be mixed with inert ingredients or carriers, such as, sodium sulfate. When they are added to detergent compositions good results are obtained by using concentrations of the bacterial enzyme composition of 1, 1.4 or 2 percent in typical household detergent powders. The detergent enzyme formulations are then added to the wash waters at about 0.15-percent level and fabrics are washed with such waters at standard conditions (wash cycle of 10 minutes at 120° F. (48.9° C.), and a rinse cycle of 5 minutes at 100° F. (37.7° C.)—both at 100 agitator cycles per minute).

Typical laundry detergent, for example, will contain 10 percent nonionic surfactant (e.g., Triton 101), 60 percent sodium tripolyphosphate, about 20 percent sodium sulfate, and minor amounts of other additives, such as carboxymethyl cellulose, optical brighteners, and the like.

The invention makes it possible to prepare compositions which will retain their activity over relatively long periods of time and which can be stored, handled and incorporated with detergents or used as a presoak product in a very simple manner.

It will be recognized that there are some variations and modifications in the practice of the invention. The compositions prepared in accordance with the invention preferably contain 17–20 percent polyethylene glycol polymer and 83–80 percent bacterial protease. While the molecular weight of the polyethylene glycol polymer can vary over a relatively wide range, especially good results have been obtained with polymers having an average molecular weight around 3,000–3,700.

It will also be recognized that when a mixture of the polyethylene glycol polymer and bacterial protease is dried, the conditions used should be such as to avoid substantial decomposition of the protease. To this end, it is preferable to use a vacuum drier as described, for instance, in example I.

The invention is hereby claimed as follows:

1. A composition consisting essentially of bacterial protease and a water soluble normally solid polyethylene glycol polymer in an amount sufficient to improve the granulating properties of said protease.

2. A composition as claimed in claim 1 in which said polyethylene glycol polymer is present in an amount sufficient to enhance the stability of said protease.

3. A composition as claimed in claim 1 in which said polyethylene glycol polymer has an average molecular weight within the range of 950–7,500.

4. A composition as claimed in claim 1 in which said polyethylene glycol polymer has an average molecular weight within the range of 3,000–3,700.

5. A composition as claimed in claim 1 in which the weight ratio of said polymer to said protease is within the range of 1:8 to 1:3.

6. A process for preparing a granular composition consisting essentially of bacterial protease and a water soluble normally solid polyethylene glycol polymer which comprises dissolving a water soluble normally solid polyethylene glycol polymer in an aqueous concentrate of bacterial protease, the amount of said polymer being sufficient to improve the granulating properties of the resultant composition when dried, thereafter drying the resultant composition and forming the product into granules.

7. A process as claimed in claim 6 in which said polyethylene glycol polymer is added after said bacterial protease has been dried.

8. A process as claimed in claim 6 in which said polyethylene glycol polymer has an average molecular weight within the range of 3,000 to 3,700.

9. A process as claimed in claim 6 in which the weight ratio of said polymer to said protease is within the range of 1:8 to 1:3.

10. A process as claimed in claim 6 in which the resultant composition comprises approximately 17-20 percent polyethylene glycol polymer and 83-80 percent bacterial protease.

UNITED STATES PATENT OFFICE
CERTIFICATE OF CORRECTION

Patent No. 3,607,653　　　　　　　　Dated September 21, 1971

Inventor(s) Jack Ziffer and Simon Rothenberg

It is certified that error appears in the above-identified patent and that said Letters Patent are hereby corrected as shown below:

Column 2, line 2, that portion of formula (2) reading "$HOCK_2$" should read -- $HOCH_2$ --.

Signed and sealed this 29th day of February 1972.

(SEAL)
Attest:

EDWARD M. FLETCHER, JR.　　　　ROBERT GOTTSCHALK
Attesting Officer　　　　　　　　Commissioner of Patents